United States Patent
Nakamura et al.

(10) Patent No.: US 9,964,092 B2
(45) Date of Patent: May 8, 2018

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Satoshi Nakamura, Toyota (JP); Takashi Yoshida, Nagoya (JP)

(73) Assignee: TOYOTA TECHNICAL DEVELOPMENT CORPORATION, Toyota (JP)

( * ) Notice: Subject to any disclaimer, the term of this patent is extended or adjusted under 35 U.S.C. 154(b) by 0 days. days.

(21) Appl. No.: 15/243,236

(22) Filed: Aug. 22, 2016

(65) Prior Publication Data

US 2017/0058854 A1    Mar. 2, 2017

(30) Foreign Application Priority Data

Sep. 1, 2015   (JP) ................................. 2015-172208

(51) Int. Cl.
  *F02P 5/15* (2006.01)
  *F02P 9/00* (2006.01)
  (Continued)

(52) U.S. Cl.
  CPC ............. *F02P 5/1512* (2013.01); *F02P 5/152* (2013.01); *F02P 9/002* (2013.01); *F02P 9/007* (2013.01);
  (Continued)

(58) Field of Classification Search
  CPC .......... F02P 5/1512; F02P 9/007; F02P 15/10; F02P 5/152; F02P 9/002; F02P 3/04; F02P 3/0876; Y02T 10/46
  See application file for complete search history.

(56) References Cited

U.S. PATENT DOCUMENTS

| | | | |
|---|---|---|---|
| 4,558,685 A | | 12/1985 | Ishikawa et al. |
| 4,702,221 A | * | 10/1987 | Tokura ................. F02P 3/0442 123/606 |

(Continued)

FOREIGN PATENT DOCUMENTS

| | | |
|---|---|---|
| JP | S61-268872 A | 11/1986 |
| JP | 2000-337235 A | 12/2000 |

(Continued)

OTHER PUBLICATIONS

Partial Translation of Office Action dated Nov. 21, 2017 in Japanese Patent Application No. 2015-172208.

*Primary Examiner* — Joseph Dallo
(74) *Attorney, Agent, or Firm* — Oliff PLC

(57) ABSTRACT

An ECU outputs an ignition signal and a discharge waveform control signal. An ignition device performs a closing operation of an ignition switching device while the ignition signal is input into the ignition device. The ignition device adjusts a current flowing through a primary coil to a discharge current command value determined based on the discharge waveform control signal, by performing an opening-closing operation of a control switching device in a period in which the discharge waveform control signal is input into the ignition device after an input of the ignition signal into the ignition device is stopped. The ECU sets the discharge current command value that is a command value for a discharge current of a spark plug to a higher value as a rotation speed is higher, and prolongs a duration, in which discharge controller controls the discharge current, as the rotation speed is lower.

10 Claims, 9 Drawing Sheets

(51) Int. Cl.
  *F02P 5/152* (2006.01)
  *F02P 15/10* (2006.01)
  *F02P 3/04* (2006.01)
  *F02P 3/08* (2006.01)

(52) U.S. Cl.
  CPC ............... *F02P 15/10* (2013.01); *F02P 3/04* (2013.01); *F02P 3/0876* (2013.01); *Y02T 10/46* (2013.01)

(56) References Cited

U.S. PATENT DOCUMENTS

| | | | | |
|---|---|---|---|---|
| 5,365,905 | A * | 11/1994 | Kanehiro | F02P 17/12 123/406.14 |
| 6,020,742 | A * | 2/2000 | Kano | F02P 17/12 324/378 |
| 6,526,953 | B1 * | 3/2003 | Inagaki | F02P 3/0435 123/609 |
| 2001/0039941 | A1 * | 11/2001 | Yamada | F02D 37/02 123/406.14 |
| 2002/0056445 | A1 * | 5/2002 | Inagaki | F02P 3/0456 123/609 |
| 2003/0116148 | A1 * | 6/2003 | Sakakura | F02P 3/051 123/630 |
| 2006/0021607 | A1 | 2/2006 | Toriyama | |
| 2015/0192100 | A1 * | 7/2015 | Kurahashi | F02P 15/08 123/406.12 |
| 2016/0305392 | A1 * | 10/2016 | Nakamura | F02P 3/051 |

FOREIGN PATENT DOCUMENTS

| | | |
|---|---|---|
| JP | 2001-032758 A | 2/2001 |
| JP | 2001-153016 A | 6/2001 |
| JP | 2006-063973 A | 3/2006 |
| JP | 2007-285162 A | 11/2007 |
| JP | 2013-024060 A | 2/2013 |
| JP | 2015-014237 A | 1/2015 |
| WO | 2014/103555 A1 | 7/2014 |

* cited by examiner

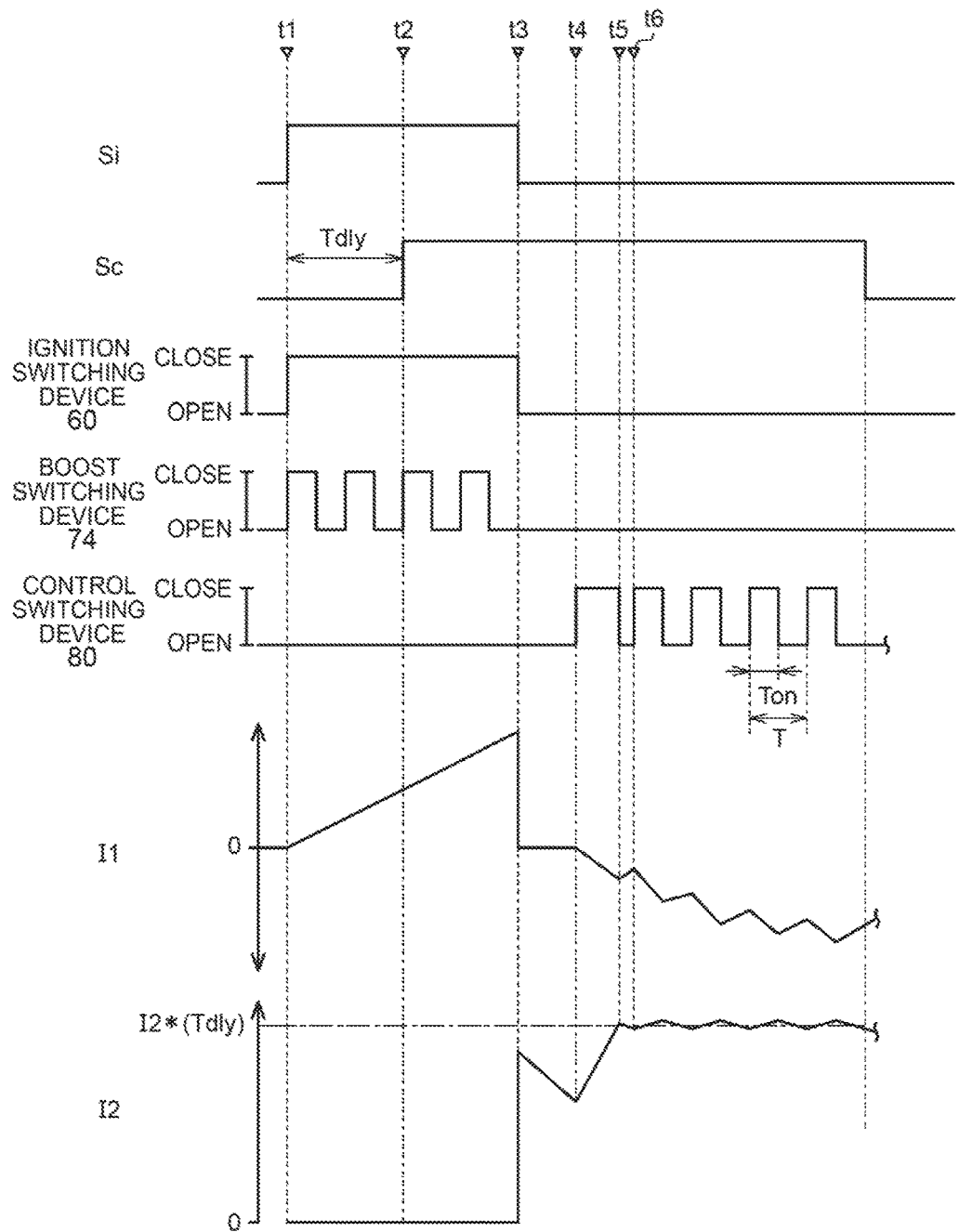

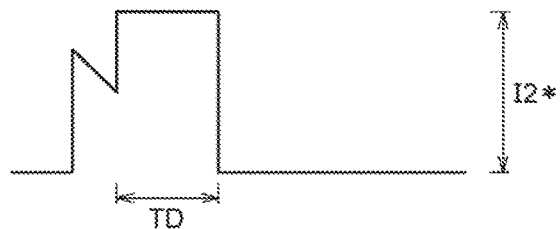
FIG. 7A  HIGH-SPEED ROTATION
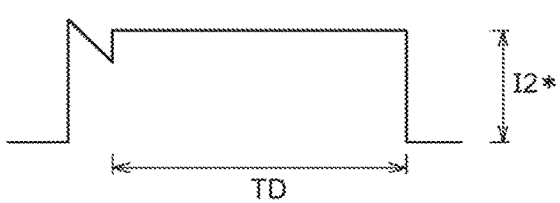
FIG. 7B  LOW-SPEED ROTATION
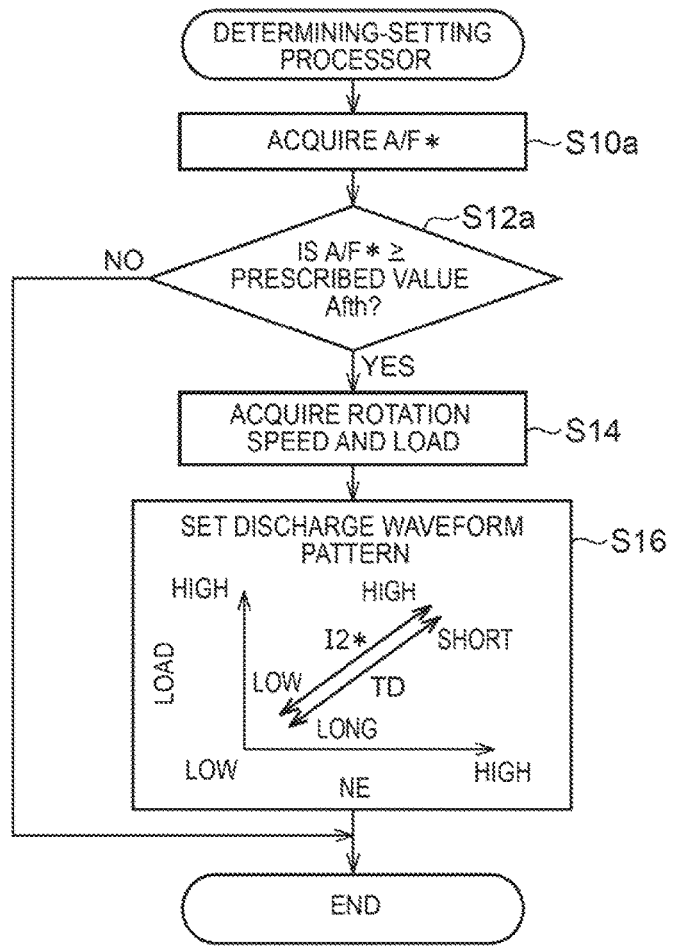
FIG. 8

CONTROL DEVICE FOR INTERNAL COMBUSTION ENGINE

INCORPORATION BY REFERENCE

The disclosure of Japanese Patent Application No. 2015-172208 filed on Sep. 1, 2015 including the specification, drawings and abstract is incorporated herein by reference in its entirety.

BACKGROUND OF THE INVENTION

1. Field of the Invention

The invention relates to a control device for an internal combustion engine, the control device configured to control the controlled variables of an internal combustion engine by operating an ignition device including a spark plug provided in a combustion chamber of the internal combustion engine, and an ignition coil connected to the spark plug.

2. Description of Related Art

For example, Japanese Patent Application Publication No. 2013-24060) (JP 2013-24060 A) describes a device that increases a discharge current of a spark plug when the rate of airflow is adjusted to be equal to or higher than a prescribed value by an airflow control valve during execution of exhaust gas recirculation (EGR) control for introducing exhaust gas from an exhaust passage into an intake passage. Moreover, this device corrects the discharge current to a higher value as the ignition timing is advanced. Such a correction is made in view of the fact that, when the rate of airflow increases or the ignition timing is advanced, a discharge-current interruption, that is, a phenomenon in which a discharge current that flows between two electrodes (i.e., a pair of electrodes) of the spark plug is interrupted, is likely to occur due to an increase in the length of a path of the discharge current (refer to paragraph 0039 of JP 2013-24060 A).

When a discharge-current interruption occurs, the ignitability of an air-fuel mixture in a combustion chamber deteriorates. In view of this, if the occurrence of a discharge-current interruption can be reduced by the device, deterioration of the ignitability can be reduced. The present inventors have found that, in some operation states of an internal combustion engine, prolonging a current discharge duration is more effective than increasing the magnitude of a discharge current, in improving the ignitability of an air-fuel mixture in a combustion chamber. However, prolonging a current discharge duration in addition to increasing the magnitude of a discharge current causes an increase in the amount of energy consumed by an ignition device or creates the need for an increase in the thermal rating of the ignition device.

SUMMARY OF THE INVENTION

The invention provides a control device for an internal combustion engine, the control device configured to set a discharge current and a current discharge duration to values suitable for efficiently improving the ignitability.

Hereinafter, a solution to the above-described problem and operations and advantageous effects thereof will be described. An aspect of the invention relates to a control device for an internal combustion engine. The control device is configured to control a controlled variable of the internal combustion engine by operating an ignition device including a spark plug provided in a combustion chamber of the internal combustion engine, an ignition coil connected to the spark plug, a discharge control circuit configured to maintain a discharge current after the spark plug starts electric discharge, and a discharge controller configured to control the discharge current by operating the discharge control circuit. The control device includes a determining processor, and an execution command processor. The determining processor is configured to determine, based on a constituent ratio of an air-fuel mixture in the combustion chamber, whether or not an ignitability of the air-fuel mixture in the combustion chamber in a case where discharge current control by the discharge controller is not executed after the spark plug starts electric discharge, is equal to or lower than a prescribed ignitability. The execution command processor is configured to cause the discharge controller to execute the discharge current control when the determining processor determines that the ignitability is equal to or lower than the prescribed ignitability. The execution command processor includes a setting processor configured to set a discharge current command value and a current discharge duration. The discharge current command value is a command value for the discharge current control executed by the discharge controller. The current discharge duration is a period of time during which the discharge controller controls the discharge current. The setting processor is configured to set the discharge current command value to a higher value when a rotation speed of the internal combustion engine is high than when the rotation speed of the internal combustion engine is low. The setting processor is configured to set the current discharge duration to a smaller value when the rotation speed of the internal combustion engine is high than when the rotation speed of the internal combustion engine is low.

In the configuration described above, when the ignitability of the air-fuel mixture in the combustion chamber in the case where the discharge current control by the discharge controller is not executed after the spark plug starts electric discharge, is equal to or lower than the prescribed ignitability, the ignitability of the air-fuel mixture in the combustion chamber is improved by the discharge current control executed by the discharge controller.

In the configuration described above, when the discharge current control is executed by the discharge controller, the setting processor sets the command value for a discharge current controlled by the discharge controller (discharge current command value) to a higher value when the rotation speed of the internal combustion engine is high than when the rotation speed of the internal combustion engine is low. When the rotation speed is high, a discharge-current interruption is likely to occur due to an increase in the rate of airflow in the combustion chamber. This reduces the ignitability. The occurrence of a discharge-current interruption cannot be reduced by prolonging the current discharge duration. However, the occurrence of a discharge-current interruption can be reduced by increasing the discharge current.

Meanwhile, when the discharge current control is executed by the discharge controller, the setting processor sets the current discharge duration, which is a period of time during which the discharge controller controls the discharge current, to a greater value when the rotation speed of the internal combustion engine is low than when the rotation speed of the internal combustion engine is high. The inventors have found that prolonging the current discharge duration is more effective than increasing the discharge current in improving the ignitability through the operation of the discharge control circuit by the discharge controller, when the determining processor determines that the ignitability of the air-fuel mixture is equal to or lower than the prescribed ignitability although the risk of a discharge-current interruption due to an airflow is low because the rotation speed is low.

In view of this, in the configuration described above, the discharge current and the current discharge duration can be set to values suitable for efficiently improving the ignitability, by selectively choosing increasing the discharge current or prolonging the current discharge duration based on the rotation speed.

In the control device for the internal combustion engine, the setting processor may variably set the discharge current command value and the current discharge duration based on a load on the internal combustion engine in addition to the rotation speed.

When the load on the internal combustion engine varies, the voltage across two electrodes of the spark plug, which is required in order to adjust the discharge current to the same discharge current command value, may vary. When the required voltage varies, the energy consumed by the spark plug at the time of controlling the discharge current varies. Therefore, when the discharge current command value and the current discharge duration are set regardless of a load to satisfy the thermal rating of the ignition device in all the operating ranges, there may be still room to further increase the discharge current command value or to further prolong the current discharge duration, in some operating ranges. In view of this, in the configuration described above, the discharge current command value can be increased as much as possible or the current discharge duration can be prolonged as much as possible while the thermal rating of the ignition device is satisfied, by setting the discharge current command value and the current discharge duration based on the load.

The control device for the internal combustion engine may further include a correcting processor configured to make a correction of prolonging the current discharge duration set by the setting processor when an air-fuel ratio in the combustion chamber of the internal combustion engine is equal to or higher than a specified value, and the specified value may be higher than a stoichiometric air-fuel ratio.

The ignitability is lower when the air-fuel ratio is higher than the stoichiometric air-fuel ratio than when the air-fuel ratio is lower than the stoichiometric air-fuel ratio. The inventors have found that prolonging the current discharge duration is more effective than increasing the discharge current in compensating for reduction in the ignitability due to a high air-fuel ratio. In view of this, in the configuration described above, the correcting processor makes a correction of prolonging the current discharge duration when the air-fuel ratio is equal to or higher than the specified value, thereby appropriately compensating for reduction in the ignitability due to a high air-fuel ratio.

The internal combustion engine may further include a recirculation passage that provides communication between an exhaust passage and an intake passage, and a recirculation valve that adjusts a flow passage cross-sectional area of the recirculation passage. The control device for the internal combustion engine may further include a correcting processor configured to make a correction of prolonging the current discharge duration set by the setting processor when an exhaust gas recirculation ratio (i.e., EGR ratio) is equal to or higher than a specified ratio. The exhaust gas recirculation ratio is a ratio of exhaust gas flowing into the combustion chamber through the recirculation passage with respect to a fluid flowing into the combustion chamber.

The ignitability is reduced as the EGR ratio becomes high to some extent. The inventors have found that prolonging the current discharge duration is more effective than increasing the discharge current in compensating for reduction in the ignitability due to a high EGR ratio. In view of this, in the configuration described above, the correcting processor makes a correction of prolonging the current discharge duration when the EGR ratio is equal to or higher than the specified ratio, thereby appropriately compensating for reduction in the ignitability due to a high EGR ratio.

The control device for the internal combustion engine may further include a correcting processor configured to make a correction of prolonging the current discharge duration set by the setting processor when an ignition timing of the internal combustion engine is advanced by an amount equal to or greater than a prescribed amount with respect to a reference value.

The temperature of the air-fuel mixture in the combustion chamber at the ignition timing is lower and thus the ignitability is lower when the ignition timing is advanced by an amount equal to or greater than the prescribed amount with respect to the reference value than when the ignition timing is not advanced. The inventors have found that prolonging the current discharge duration is more effective than increasing the discharge current in compensating for reduction in the ignitability due to advancement of the ignition timing. In view of this, in the configuration described above, the correcting processor makes a correction of prolonging the current discharge duration when the ignition timing is advanced by an amount equal to or greater than the prescribed amount with respect to the reference value, thereby appropriately compensating for reduction in the ignitability due to advancement of the ignition timing.

The control device for the internal combustion engine may further include a correcting processor configured to make a correction of prolonging the current discharge duration set by the setting processor when at least one of a condition that a temperature in an intake passage of the internal combustion engine is equal to or lower than a prescribed temperature and a condition that a coolant temperature is equal to or lower than a prescribed coolant temperature is satisfied.

The ignitability is lower when the temperature in the intake passage is equal to or lower than the prescribed temperature or the coolant temperature is equal to or lower than the prescribed coolant temperature than when the temperature in the intake passage is higher than the prescribed temperature or the coolant temperature is higher than the prescribed coolant temperature. The inventors have found that prolonging the current discharge duration is more effective than increasing the discharge current in compensating for reduction in the ignitability due to the temperature in the intake passage being equal to or lower than the prescribed temperature or due to the coolant temperature being equal to or lower than the prescribed coolant temperature. In view of this, in the configuration described above, the correcting processor makes a correction of prolonging the current discharge duration when the temperature in the intake passage is equal to or lower than the prescribed temperature or the coolant temperature is equal to or lower than the prescribed coolant temperature, thereby appropriately compensating for reduction in the ignitability due to the temperature in the intake passage being equal to or lower than the prescribed temperature or due to the coolant temperature being equal to or lower than the prescribed coolant temperature.

The control device for the internal combustion engine may further include: a detecting processor configured to detect reduction in the ignitability of the air-fuel mixture in the combustion chamber; and a correcting processor configured to make a correction of prolonging the current discharge duration set by the setting processor when the detecting processor detects reduction in the ignitability.

In the configuration described above, when the detecting processor actually detects reduction in the ignitability, the correcting processor makes a correction of prolonging the current discharge duration. Thus, it is possible to compensate for the reduction in the ignitability.

The internal combustion engine may include a recirculation passage that provides communication between an exhaust passage and an intake passage, and a recirculation valve that adjusts a flow passage cross-sectional area of the recirculation passage. In the control device for the internal combustion engine, the determining processor may be configured to determine that the ignitability of the air-fuel mixture in the combustion chamber is equal to or lower than the prescribed ignitability when an exhaust gas recirculation ratio is equal to or higher than a prescribed ratio. The exhaust gas recirculation ratio is a ratio of exhaust gas flowing into the combustion chamber through the recirculation passage with respect to a fluid flowing into the combustion chamber.

The inventors have found that, as the EGR ratio increases, the ignition delay is increased if the discharge controller does not execute the discharge current control by operating the discharge control circuit after the spark plug starts electric discharge. The ignition delay is a required period from the ignition timing until the air-fuel mixture is ignited. In view of this, in the configuration described above, the EGR ratio is used as a parameter for determining whether or not the ignitability is equal to or lower than the prescribed ignitability.

In the control device for the internal combustion engine, the determining processor may determine that the ignitability of the air-fuel mixture in the combustion chamber is equal to or lower than the prescribed ignitability when an air-fuel ratio of the air-fuel mixture in the combustion chamber is equal to or higher than a prescribed value.

The inventors have found that, as the air-fuel ratio increases, the ignition delay is increased if the discharge controller does not execute the discharge current control by operating the discharge control circuit after the spark plug starts electric discharge. The ignition delay is a required period from the ignition timing until the air-fuel mixture is ignited. In view of this, in the configuration described above, the air-fuel ratio is used as a parameter for determining whether or not the ignitability is equal to or lower than the prescribed ignitability.

In the control device for the internal combustion engine, the ignition device may include an ignition switching device and a control switching device. The ignition switching device is configured to open and close a first loop circuit including a primary coil of the ignition coil and a first power source. The control switching device is configured to open and close a second loop circuit including a second power source and the primary coil. The discharge control circuit may include the control switching device. The discharge controller may be configured to control the discharge current of the spark plug by performing an opening-closing operation of the control switching device after the spark plug discharges electricity due to an electromotive force that is generated in a secondary coil of the ignition coil when the ignition switching device is switched from a closed state to an open state. A polarity of a voltage that is applied to the primary coil by the first power source when the first loop circuit is turned into a closed-loop circuit and a polarity of a voltage that is applied to the primary coil by the second power source when the second loop circuit is turned into a closed-loop circuit may be opposite to each other.

In the configuration described above, the voltage having a polarity opposite to that of the voltage applied to the primary coil when the first loop circuit is turned into a closed-loop circuit is applied to the primary coil in response to a closing operation of the control switching device. When the absolute value of a current flowing through the primary coil is increased through an opening-closing operation of the control switching device, it is possible to control the discharge current of the spark plug based on the rate of increase in the absolute value of a current flowing through the primary coil.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a time-series chart illustrating ignition control according to the first embodiment;

FIG. 7A is a graph illustrating a discharge pattern during high speed rotation according to the first embodiment;

FIG. 7B is a graph illustrating a discharge pattern during low speed rotation according to the first embodiment;

FIG. 8 is a flowchart illustrating the procedure of processes executed by a determining-setting processor according to a second embodiment;

DETAILED DESCRIPTION OF EMBODIMENTS

First Embodiment

Hereinafter, a control device for an internal combustion engine according to a first embodiment will be described with reference to the accompanying drawings.

Figure 1:
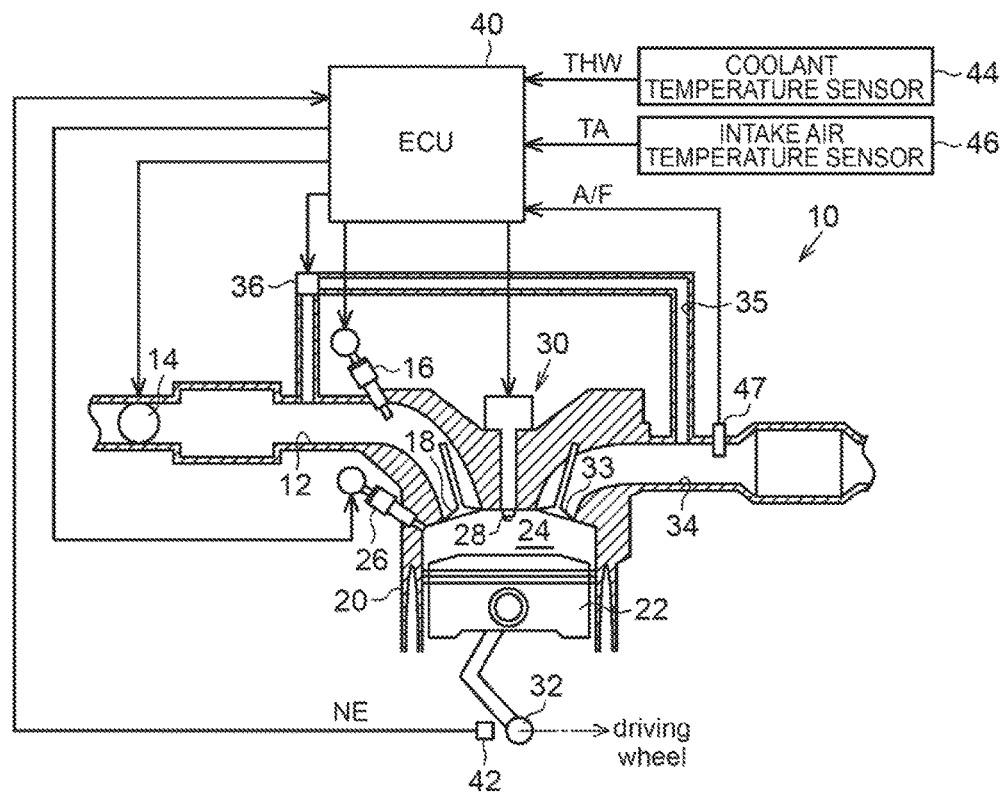
FIG. 1 is a configuration diagram of a system including a control device for an internal combustion engine according to a first embodiment.

An internal combustion engine 10 illustrated in FIG. 1 is a spark-ignition multi-cylinder internal combustion engine. An intake passage 12 of the internal combustion engine 10 is provided with an electronically-controlled throttle valve 14 that variably adjusts the flow passage cross-sectional area of the intake passage 12. Port injection valves 16 that inject fuel into intake ports are provided in the intake passage 12, at positions downstream of the throttle valve 14. The air in the intake passage 12 and the fuel injected from the port injection valves 16 are supplied into combustion chambers 24 each defined by a cylinder 20 and a piston 22, in response to valve-opening operations of intake valves 18. Injection ports of direct injection valves 26 face the combustion chambers 24, and thus, the fuel can be directly injected to be supplied into the combustion chambers 24 by the direct injection valves 26. Spark plugs 28 of an ignition device 30 protrude into the combustion chambers 24. An air-fuel mixture composed of air and fuel is ignited by an ignition spark produced by the spark plug 28, so that the air-fuel mixture is burned. A part of energy produced from combustion of the air-fuel mixture is converted, through the pistons 22, into energy for rotating a crankshaft 32. Drive wheels of a vehicle can be mechanically coupled to the crankshaft 32. In the present embodiment, description will be provided on the assumption that the vehicle includes the internal combustion engine 10 as a single drive power source that supplies drive power to the drive wheels.

The air-fuel mixture that has been burned is discharged, as exhaust gas, to an exhaust passage 34, in response to valve-opening operations of exhaust valves 33. The exhaust passage 34 is connected to the intake passage 12 through a recirculation passage 35. The recirculation passage 35 is provided with a recirculation valve 36 that adjusts the flow passage cross-sectional area of the recirculation passage 35.

An electronic controller (ECU) 40 is a control device that controls the internal combustion engine 10 as a controlled object. The ECU 40 acquires output values from various sensors, such as a crank angle sensor 42 that detects a rotation speed NE of the crankshaft 32, a coolant temperature sensor 44 that detects a coolant temperature THW, an intake air temperature sensor 46 that detects an intake air temperature TA, and an air-fuel ratio sensor 47 that detects an air-fuel ratio A/F of the air-fuel mixture in the combustion chamber 24 based on the exhaust constituent. The controlled variables (e.g. torque, exhaust characteristics) of the internal combustion engine 10 are controlled by operating various actuators, such as the throttle valve 14, the port injection valves 16, the direct injection valves 26, and the ignition device 30 based on the acquired output values. For example, in order to desirably control the exhaust characteristics as the controlled variables, the ECU 40 adjusts an injection amount of each port injection valve 16 and an injection amount of each direct injection valve 26 through feedback control for adjusting the air-fuel ratio A/F detected by the air-fuel ratio sensor 47 to a target value A/F*.

Figure 2:
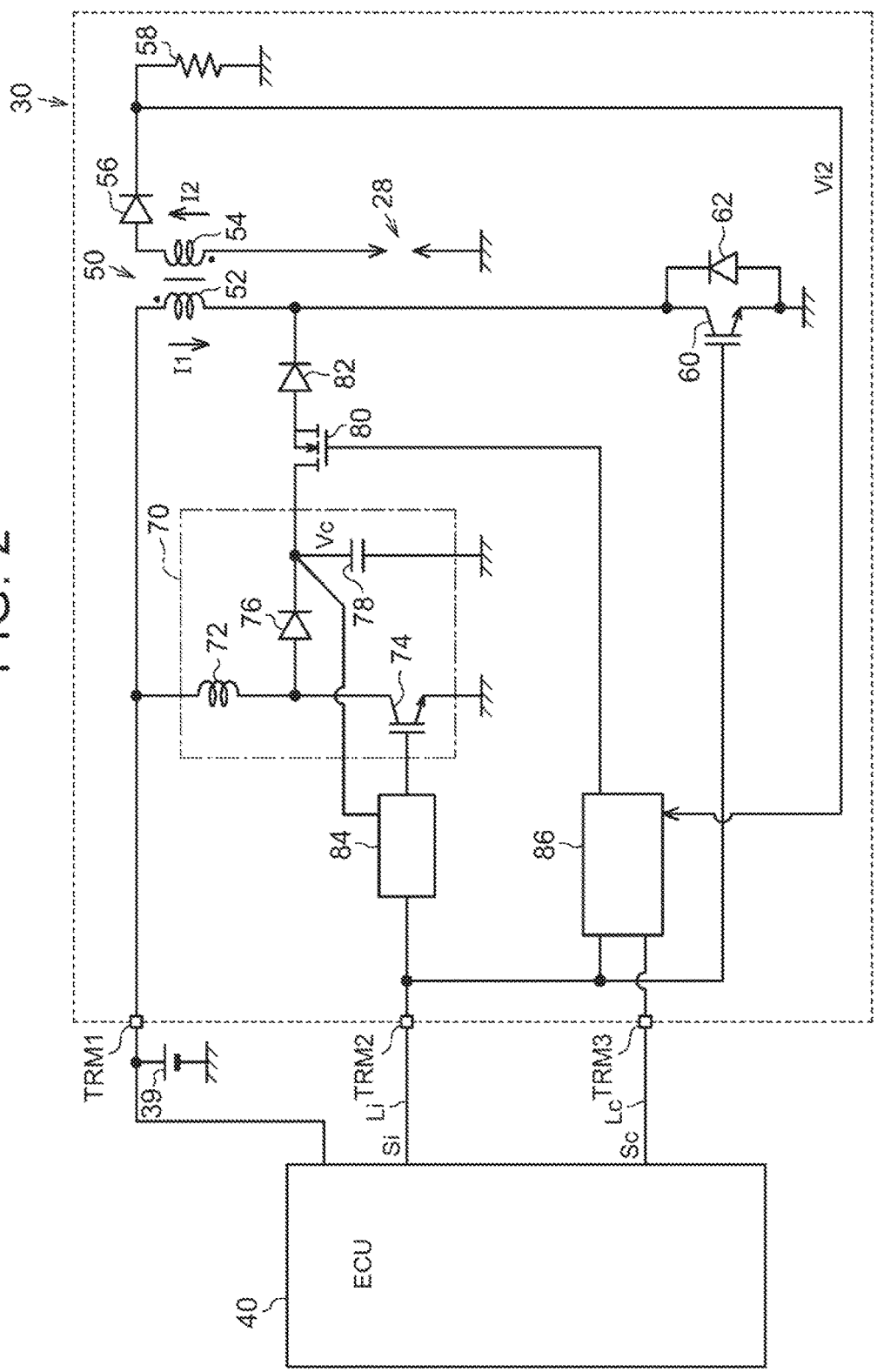
FIG. 2 is a circuit diagram illustrating the circuit configuration of an ignition control system according to the first embodiment.

FIG. 2 illustrates a circuit configuration of each ignition device 30. As illustrated in FIG. 2, the ignition device 30 includes an ignition coil 50 in which a primary coil 52 and a secondary coil 54 are magnetically coupled to each other. In FIG. 2, a black circle is placed on one of two terminals (i.e., a pair of terminals) of each of the primary coil 52 and the secondary coil 54. The black circles in FIG. 2 indicate the terminals at which the polarity of electromotive force generated in the primary coil 52 and the polarity of electromotive force generated in the secondary coil 54 coincide with each other when a magnetic flux interlinking thereof is changed in a state where both ends of each of the primary coil 52 and the secondary coil 54 are open.

The spark plug 28 is connected to one of the terminals of the secondary coil 54, and the other one of the terminals of the secondary coil 54 is grounded via a diode 56 and a shunt resistor 58. The diode 56 is a rectifying device that allows a flow of current in a direction from the spark plug 28 toward the ground through the secondary coil 54, and that restricts a flow of current in the opposite direction. The shunt resistor 58 is a resistive element for detecting a current flowing through the secondary coil 54, based on a voltage drop Vi2. In other words, the shunt resistor 58 is a resistive element for detecting a discharge current of the spark plug 28.

A positive electrode of an external battery 39 is connected to one of the terminals of the primary coil 52 of the ignition coil 50 via a terminal TRM1 of the ignition device 30. The other one of the terminals of the primary coil 52 is grounded via an ignition switching device 60. In the present embodiment, an insulated gate bipolar transistor (IGBT) is used as the ignition switching device 60. A diode 62 is connected to the ignition switching device 60 by inverse-parallel connection.

The electric power obtained from the terminal TRM1 is also taken into a booster circuit 70. In the present embodiment, a boost chopper circuit constitutes the booster circuit 70. That is, the booster circuit 70 includes an inductor 72 that is connected at its one end to the terminal TRM1 side, and the other end of the inductor 72 is grounded via a boost switching device 74. In the present embodiment, an insulated gate bipolar transistor (IGBT) is used as the boost switching device 74. The anode side of a diode 76 is connected to a spot between the inductor 72 and the boost switching device 74, and the cathode side of the diode 76 is grounded via a capacitor 78. A charging voltage Vc of the capacitor 78 is an output voltage of the booster circuit 70.

A spot between the diode 76 and the capacitor 78 is connected to a spot between the primary coil 52 and the ignition switching device 60 via a control switching device 80 and a diode 82. In other words, an output terminal of the booster circuit 70 is connected to the spot between the primary coil 52 and the ignition switching device 60 via the control switching device 80 and the diode 82. In the present embodiment, a metal-oxide-semiconductor (MOS) field-effect transistor is used as the control switching device 80. The diode 82 is a rectifying device that prevents a current from flowing backward from the primary coil 52 and ignition switching device 60 side toward the booster circuit 70 via a parasitic diode of the control switching device 80.

A boost controller 84 is a drive circuit that controls an output voltage of the booster circuit 70 by performing an opening-closing operation of the boost switching device 74 based on an ignition signal Si input into a terminal TRM2. The boost controller 84 monitors the output voltage of the booster circuit 70 (the charging voltage Vc of the capacitor 78), and stops the opening-closing operation of the boost switching device 74 when the output voltage becomes equal to or higher than a prescribed value.

A discharge controller 86 is a drive circuit that controls a discharge current of the spark plug 28 by performing an opening-closing operation of the control switching device 80 based on the ignition signal Si input into the terminal TRM2, and a discharge waveform control signal Sc input into a terminal TRM3.

The terminal TRM2 of the ignition device 30 is connected to the ECU 40 through an ignition communication line Li. The terminal TRM3 is connected to the ECU 40 through a waveform control communication line Lc. When an exhaust gas recirculation (EGR) ratio that is a ratio of the exhaust gas flowing into the combustion chamber 24 through the recirculation passage 35 with respect to a fluid flowing into the combustion chamber 24 is lower than a prescribed ratio Eth, the ECU 40 outputs the ignition signal Si through the ignition communication line Li and the ECU 40 does not output the discharge waveform control signal Sc to the waveform control communication line Lc. When the EGR ratio is equal to or higher than the prescribed ratio Eth, the ECU 40 outputs the ignition signal Si through the ignition communication line Li and the ECU 40 also outputs the discharge waveform control signal Sc through the waveform control communication line Lc. In this case, in the present embodiment, both the ignition signal Si and the discharge waveform control signal Sc are pulse signals of a logic H.

Next, with reference to FIG. 3 and FIGS. 4A to 4D, from among ignition controls according to the present embodiment, ignition control executed in particular when the EGR ratio is equal to or higher than the prescribed ratio Eth will be described. FIG. 3 illustrates a transition of the ignition signal Si, a transition of the discharge waveform control signal Sc, a state transition of an opening-closing operation of the ignition switching device 60, and a state transition of an opening-closing operation of the boost switching device 74. FIG. 3 further illustrates a state transition of an opening-closing operation of the control switching device 80, a transition of a current I1 flowing through the primary coil 52, and a transition of a current I2 flowing through the secondary coil 54. Regarding the signs of the currents I1, I2, the sides indicated by the arrows in FIG. 2 are defined as the positive sides.

Figure 4A:
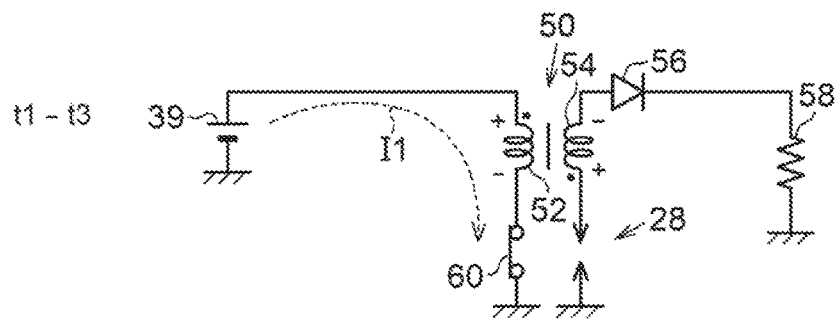
FIG. 4A is a circuit diagram illustrating the ignition control according to the first embodiment.

When the ignition signal Si is input into the ignition device 30 at time t1, the ignition device 30 performs an on-operation (closing operation) of the ignition switching device 60. Thus, the current I1 flowing through the primary coil 52 increases gradually. FIG. 4A illustrates a path of a current flowing through the primary coil 52 in this case. As illustrated in FIG. 4A, when a closing operation of the ignition switching device 60 is performed, a first loop circuit that is a loop circuit including the battery 39, the primary coil 52, and the ignition switching device 60 is turned into a closed-loop circuit, so that a current flows through the closed-loop circuit. As the current flowing through the primary coil 52 increases gradually, an interlinkage magnetic flux of the secondary coil 54 increases gradually. Thus, an electromotive force that cancels out an increase in the interlinkage magnetic flux is generated in the secondary coil 54. However, the electromotive force is an electromotive force that applies a negative voltage to the anode side of the diode 56, and thus no current flows through the secondary coil 54.

As illustrated in FIG. 3, when the ignition signal Si is input into the ignition device 30, the boost controller 84 performs an opening-closing operation of the boost switching device 74. Then, the discharge waveform control signal Sc is input into the ignition device 30 at time t2 at which a delay time Tdly has elapsed after time t1 at which the ignition signal Si is input into the ignition device 30.

Then, when an input of the ignition signal Si into the ignition device 30 is stopped at time t3, that is, when the voltage of the ignition communication line Li is changed from a voltage of the logic H to a voltage of a logic L at time t3, the ignition device 30 performs an opening operation of the ignition switching device 60. Thus, the current I1 flowing through the primary coil 52 becomes zero, and a current flows through the secondary coil 54 due to a counter-electromotive force generated in the secondary coil 54. Thus, the spark plug 28 starts electric discharge.

Figure 4B:
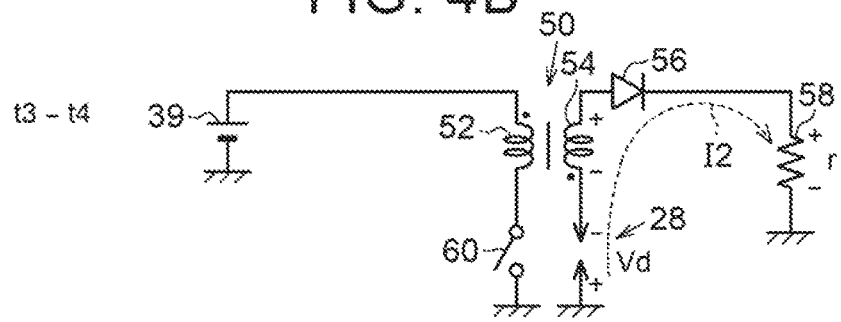
FIG. 4B is a circuit diagram illustrating the ignition control according to the first embodiment.

FIG. 4B illustrates a path of a current in this case. As illustrated in FIG. 4B, when the interlinkage magnetic flux of the secondary coil 54 attempts to decrease due to interruption of a current flowing through the primary coil 52, a counter-electromotive force in a direction of cancelling out a decrease in the interlinkage magnetic flux is generated in the secondary coil 54. Thus, the current I2 flows through the spark plug 28, the secondary coil 54, the diode 56, and the shunt resistor 58. When the current I2 flows through the secondary coil 54, a voltage drop Vd occurs in the spark plug 28, and a voltage drop of "r·I2" corresponding to a resistance value r of the shunt resistor 58 occurs in the shunt resistor 58. Thus, if, for example, a voltage drop in the diode 56 in the forward direction is ignored, a voltage of "Vd+r·I2", which is the sum of the voltage drop Vd in the spark plug 28 and the voltage drop in the shunt resistor 58, is applied to the secondary coil 54. This voltage causes a gradual decrease in the interlinkage magnetic flux of the secondary coil 54. A gradual decrease in the current I2 flowing through the secondary coil 54 during a period from time t3 to time t4 in FIG. 3 is a phenomenon caused due to application of the voltage of "Vd+r·I2" to the secondary coil 54.

Figure 4C:
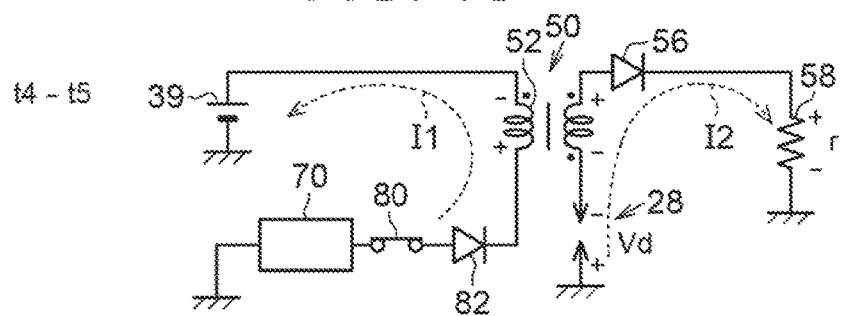
FIG. 4C is a circuit diagram illustrating the ignition control according to the first embodiment.

As illustrated in FIG. 3, after time t4, the discharge controller 86 performs an opening-closing operation of the control switching device 80. FIG. 4C illustrates a path of a current during a period from time t4 to time t5, in which the control switching device 80 is in a closed state (on-state). In this case, a second loop circuit that is a loop circuit including the booster circuit 70, the control switching device 80, the diode 82, the primary coil 52, and the battery 39 is turned into a closed-loop circuit, so that a current flows through the closed-loop circuit.

Figure 4D:
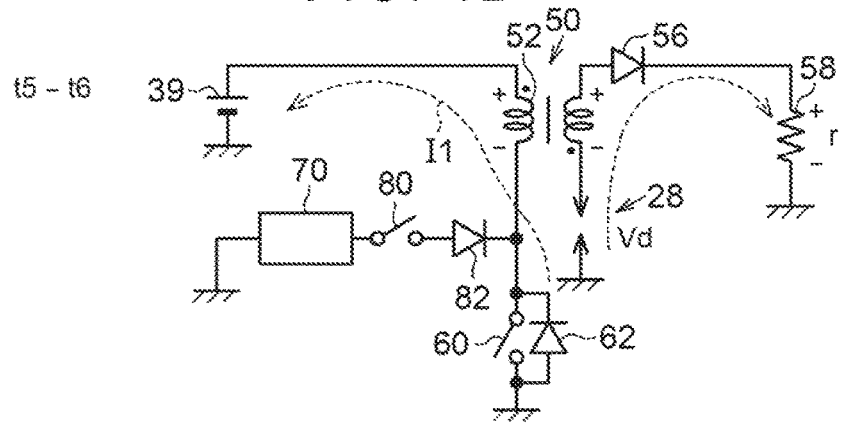
FIG. 4D is a circuit diagram illustrating the ignition control according to the first embodiment.

FIG. 4D illustrates a path of a current during a period from time t5 to time t6, in which the control switching device 80 is in an open state (off-state). In this case, a counter-electromotive force that cancels out a change in the magnetic flux due to a decrease in the absolute value of a current flowing through the primary coil 52 is generated in the primary coil 52. Thus, a third loop circuit that is a loop circuit including the diode 62, the primary coil 52, and the battery 39 is turned into a closed-loop circuit, so that a current flows through the closed-loop circuit.

The current flowing through the primary coil 52 can be controlled by adjusting a time ratio D that is a ratio of a closing operation period Ton with respect to one cycle T of an opening-closing operation of the control switching device 80 illustrated in FIG. 3. The discharge controller 86 executes control for gradually increasing the absolute value of the current I1 flowing through the primary coil 52, based on the time ratio D. The current I1 in this period is opposite in sign to the current I1 flowing through the primary coil 52 when the ignition switching device 60 is in the closed state. Therefore, if the magnetic flux generated due to the current I1 flowing through the primary coil 52 when the ignition switching device 60 is in the closed state is defined as a reference, the current I1 generated through an opening-closing operation of the control switching device 80 causes a decrease in the magnetic flux. In this case, when the rate of gradual decrease in the interlinkage magnetic flux of the secondary coil 54 due to the current I1 flowing through the primary coil 52 coincides with the rate of gradual decrease at the time when the voltage of "Vd+r·I2" is applied to the secondary coil 54, the current flowing through the secondary coil 54 is not decreased. In this case, an electric power loss caused by the spark plug 28 and the shunt resistor 58 is compensated for by the electric power output from a power source constituted by the booster circuit 70 and the battery 39.

On the other hand, when the rate of gradual decrease in the interlinkage magnetic flux of the secondary coil 54 due to the current I1 flowing through the primary coil 52 is lower than the rate of gradual decrease at the time when the voltage of "Vd+r·I2" is applied to the secondary coil 54, the current I2 flowing through the secondary coil 54 is gradually decreased. Due to a gradual decrease in the current I2, the interlinkage magnetic flux is gradually decreased at the rate of gradual decrease at the time when the voltage of "Vd+r·I2" is applied to the secondary coil 54. However, the rate of gradual decrease in the current I2 flowing through the secondary coil 54 is lower than that when the absolute value of the current I1 flowing through the primary coil 52 does not increase gradually.

When the absolute value of the current I1 flowing through the primary coil 52 is increased gradually such that the actual rate of gradual decrease in the interlinkage magnetic flux becomes higher than the rate of gradual decrease in the interlinkage magnetic flux of the secondary coil 54 at the time when the voltage of "Vd+r·I2" is applied to the secondary coil 54, the voltage of the secondary coil 54 increases due to the counter-electromotive force that prevents a decrease in the interlinkage magnetic flux. The current I2 flowing through the secondary coil 54 increases such that the voltage of "Vd+r·I2" becomes equal to the voltage of the secondary coil 54.

As described above, the current I2 flowing through the secondary coil 54 can be controlled by controlling the rate of gradual increase in the absolute value of the current I1 flowing through the primary coil 52. In other words, the discharge current of the spark plug 28 can be controlled so as to be either increased or decreased.

The discharge controller 86 adjusts the time ratio D of the control switching device 80 in order to adjust, through feedback control, a discharge current value determined based on the voltage drop Vi2 in the shunt resistor 58 to a discharge current command value I2*.

Although each of the cylinders is provided with the ignition communication line Li, the ignition coil 50, the spark plug 28, the ignition switching device 60, the diode 62, the control switching device 80, and the diode 82 illustrated in FIG. 2, only one ignition communication line Li, one ignition coil 50, one spark plug 28, one ignition switching device 60, one diode 62, one control switching device 80, and one diode 82 are illustrated in FIG. 2. In the present embodiment, multiple cylinders share a single waveform control communication line Lc, a single booster circuit 70, a single boost controller 84, and a single discharge controller 86. Based on which of the cylinders corresponds to the ignition signal Si input into the ignition device 30, the discharge controller 86 selects and operates the corresponding control switching device 80. The boost controller 84 executes boosting control when the ignition signal Si for any one of the cylinders is input into the ignition device 30.

The discharge controller 86 controls the discharge current such that the discharge current is adjusted to the discharge current command value I2* during a period from a time at which a prescribed period of time has elapsed after a falling edge of the ignition signal Si, to a falling edge of the discharge waveform control signal Sc, on condition that the ignition signal Si is not input into the ignition device 30. The discharge controller 86 variably sets the discharge current command value I2* based on the delay time Tdly. The delay time Tdly is a period of time by which the timing of an input of the discharge waveform control signal Sc into the ignition device 30 is delayed with respect to the timing of an input of the ignition signal Si into the ignition device 30, as illustrated in FIG. 3. Thus, the ECU 40 can variably sets the discharge current command value I2* by adjusting the delay time Tdly.

Figure 5:
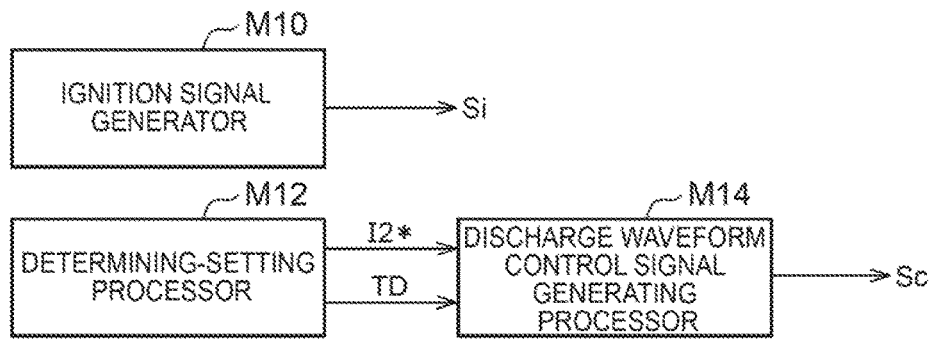
FIG. 5 is a block diagram illustrating a process of generating an ignition signal and a discharge waveform control signal according to the first embodiment.

FIG. 5 illustrates a process of generating an ignition signal Si and a discharge waveform control signal Sc, from among the processes executed by the ECU 40. An ignition signal generator M10 generates and outputs an ignition signal Si based on the ignition timing that is set based on a known technique. A determining-setting processor M12 determines whether or not discharge current control by the discharge controller 86 is executed. When the determining-setting processor M12 determines that the discharge current control by the discharge controller 86 is executed, the determining-setting processor M12 sets and outputs a current discharge duration TD that is a period of time during which the discharge controller 86 controls the discharge current, and a discharge current command value I2*. When the discharge current command value I2* and the current discharge duration TD are input into a discharge waveform control signal generating processor M14 from the determining-setting processor M12, the discharge waveform control signal generating processor M14 generates and outputs a discharge waveform control signal Sc based on the received discharge current command value I2* and current discharge duration TD.

Figure 6:
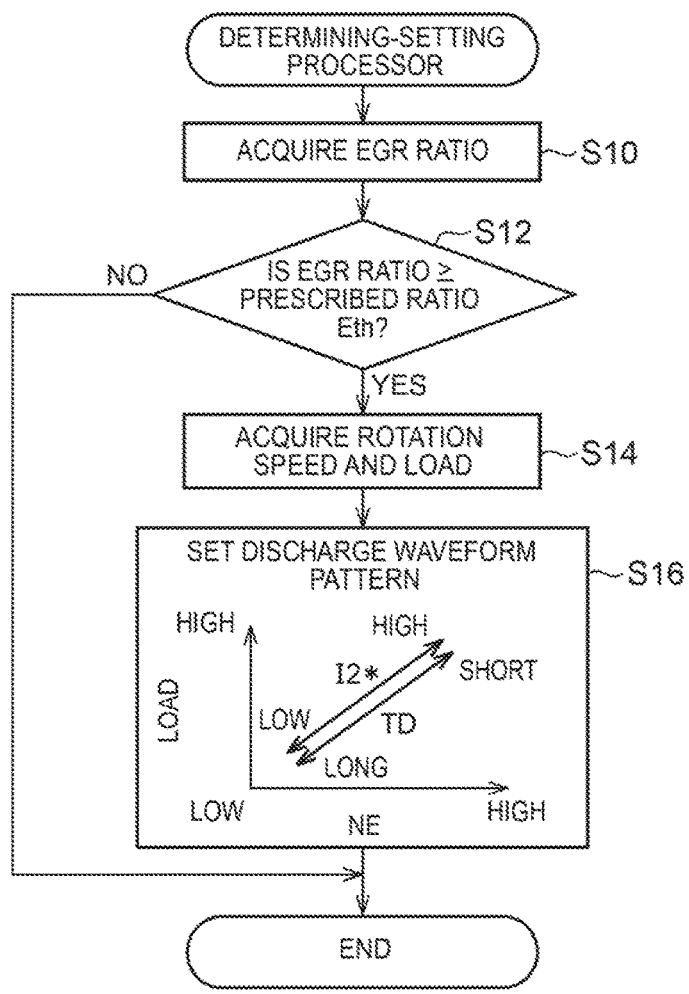
FIG. 6 is a flowchart illustrating the procedure of processes executed by a determining-setting processor according to the first embodiment.

FIG. 6 illustrates the procedure of processes executed by the determining-setting processor M12 according to the present embodiment. This series of processes is executed by the determining-setting processor M12 repeatedly, for example, in a prescribed cycle. In this series of processes, first, the determining-setting processor M12 acquires an EGR ratio (S10). The EGR ratio may be calculated by a known technique, based on, for example, the opening degree of the recirculation valve 36. Subsequently, the determining-setting processor M12 determines whether or not the EGR ratio is equal to or higher than the prescribed ratio Eth (S12). The process in S12 is executed in order to determine whether or not the ignitability of the air-fuel mixture in the combustion chamber 24 in the case where the discharge current control by the discharge controller 86 is not executed is equal to or lower than a prescribed ignitability. That is, it is determined whether or not the ignitability in the case where the spark plug 28 discharges electricity until the discharge current naturally becomes zero after the spark plug 28 starts electric discharge is equal to or lower than the prescribed ignitability. The spark plug 28 starts electric discharge in response of an opening operation of the ignition switching device 60 after the ignition switching device 60 is kept in the closed state for a prescribed period. In the present embodiment, the ignitability is determined to be higher as an ignition delay is shorter. The ignition delay is a required period from the timing at which the spark plug 28 discharges electricity (ignition timing) until the air-fuel mixture in the combustion chamber 24 is ignited. In the present embodiment, when the ignitability is equal to or lower than the prescribed ignitability, the air-fuel mixture is assumed to have a characteristic that makes it difficult to adjust the timing at which the air-fuel mixture is ignited to a desired timing by advancing the ignition timing. That is, the present embodiment is provided on the assumption that advancing the ignition timing increases the ignition delay due to a decrease in the temperature of the air-fuel mixture at the ignition timing and it is therefore difficult to use the ignition timing as a manipulated variable in reducing the ignition delay.

When the determining-setting processor M12 determines that the EGR ratio is equal to or higher than the prescribed ratio Eth (S12: YES), the determining-setting processor M12 determines that the ignitability is equal to or lower than the prescribed ignitability and the determining-setting processor M12 acquires a rotation speed NE and a load (S14). The determining-setting processor M12 sets a discharge waveform pattern for discharge current control executed by the discharge controller 86, based on the rotation speed NE and the load (S16). Specifically, the determining-setting processor M12 sets a discharge current command value I2* to a higher value as the rotation speed NE is higher. This is because the rate of airflow in the combustion chamber 24 is higher and therefore the discharge current between the two electrodes (i.e., a pair of electrode) of the spark plug 28 is more likely to be carried by the airflow and a discharge-current interruption is more likely to occur, when the rotation speed NE is high, than when the rotation speed NE is low. Further, the determining-setting processor M12 sets a current discharge duration TD to a smaller value as the rotation speed NE is higher. When the rotation speed NE is low, the rate of airflow in the combustion chamber 24 is low and therefore a discharge-current interruption is less likely to occur. However, when the process in step S16 is executed, it has been determined in step S12 that the ignitability of the air-fuel mixture is low. The present inventors have found that, when the ignitability is low and the rate of airflow is low, prolonging the current discharge duration TD is more effective than increasing the magnitude of a discharge current, in improving the ignitability of the air-fuel mixture.

More specifically, the determining-setting processor M12 variably sets the discharge current command value I2* and the current discharge duration TD based on the operating points (the rotation speed NE and the load) of the internal combustion engine 10. The load is used in this case because, even when the discharge current is the same, the voltage across the two electrodes of the spark plug 28 is higher as a load is higher. The rate of increase in the current I1 flowing through the primary coil 52 needs to be higher and thus the current I1 flowing through the primary coil 52 is higher when the voltage across the two electrodes of the spark plug 28 is high than when the voltage across the two electrodes of the spark plug 28 is low. As the current I11 is higher, the temperature of the ignition coil 50 rises and it is therefore likely to be more difficult to achieve the thermal rating. Therefore, the discharge energy that is determined based on the discharge current command value I2* and the current discharge duration TD is increased as much as possible while the thermal rating of the ignition coil 50 is achieved, by setting the discharge current command value I2* and the current discharge duration TD based on the rotation speed NE and the load.

This process can be executed based on a map that defines the relationship among the rotation speed NE, the load, and the discharge current command value I2*, and a map that defines the relationship among the rotation speed NE, the load, and the current discharge duration TD.

When the process in step S16 ends or when a negative determination is made in step S12, the determining-setting processor M12 ends this series of processes. Next, the operation of the present embodiment will be described.

When the EGR ratio is equal to or higher than the prescribed ratio Eth, if the discharge current control by the discharge controller 86 is not executed, the ignitability is assumed to be significantly lowered to fall outside an allowable range. In view of this, the ECU 40 outputs the discharge waveform control signal Sc to cause the discharge controller 86 to control a discharge current. As illustrated in FIG. 7A, when the rotation speed is high, the ECU 40 increases the discharge current command value I2* as much as possible and shortens the current discharge duration TD. During high speed rotation, if the discharge current is low, a discharge-current interruption is likely to occur. However, the occurrence of a discharge-current interruption can be reduced by increasing the discharge current command value I2*. In this case, as the discharge current flowing between the two (i.e., a pair of) electrodes of the spark plug 28 is carried by the airflow, the area in which the discharge current comes into contact with the air-fuel mixture increases. Thus, it is possible to improve the ignitability.

On the other hand, as illustrated in FIG. 7B, during low speed rotation, the ECU 40 prolongs the current discharge duration TD as much as possible instead of increasing the discharge current command value I2*. Thus, it is possible to effectively compensate for the reduction in the ignitability caused by the EGR ratio being equal to or higher than the prescribed ratio Eth, in a state where a discharge-current interruption is less likely to occur even though the discharge current is low.

The present embodiment described above produces the following advantageous effects. (1) The discharge current command value I2* and the current discharge duration TD can be set to values suitable for efficiently improving the ignitability, by selectively choosing increasing the discharge current or prolonging the current discharge duration TD based on the rotation speed NE.

(2) The EGR ratio is used as a parameter for determining whether or not the ignitability in the case where the discharge current control by the discharge controller 86 is not executed is equal to or lower than the prescribed ignitability. Thus, it is possible to appropriately determine that the ignitability is equal to or lower than the prescribed ignitability.

(3) The discharge current command value I2* and the current discharge duration TD are set based on the load in addition to the rotation speed NE. Thus, it is possible to take into account the fact that, when the discharge current is kept at a given value, the voltage across the two (i.e. a pair of) electrodes of the spark plug 28 is higher as the load is higher. As a result, it is possible to increase the discharge energy as much as possible while maintaining the discharge energy within the allowable range.

Second Embodiment

Hereinafter, a second embodiment will be described, mainly regarding the features different from those in the first embodiment, with reference to the accompanying drawings.

In the present embodiment, when the target value A/F* is equal to or higher than a prescribed value, the discharge controller 86 executes the discharge current control. FIG. 8 illustrates the procedure of processes executed by the determining-setting processor M12 according to the present embodiment. This series of processes is executed by the determining-setting processor M12 repeatedly, for example, in a prescribed cycle. In FIG. 8, the same step numbers are assigned to the processes that are the same as those illustrated in FIG. 6, for the sake of convenience.

In this series of processes illustrated in FIG. 8, first, the determining-setting processor M12 acquires a target value A/F* (S10a). The determining-setting processor M12 determines whether or not the target value A/F* is equal to or higher than a prescribed value Afth (S12a). The process in S12a is executed in order to determine whether or not the ignitability of the air-fuel mixture in the combustion chamber 24 in the case where the discharge current control by the discharge controller 86 is not executed is equal to or lower than the prescribed ignitability. When the determining-setting processor M12 determines that the target value A/F* is equal to or higher than the prescribed value Afth (S12a: YES), the determining-setting processor M12 proceeds to the process in step S14. The prescribed value Afth may be set to a value higher than the stoichiometric air-fuel ratio.

Third Embodiment

Hereinafter, a third embodiment will be described, mainly regarding the features different from those in the first embodiment, with reference to the accompanying drawings.

In the first embodiment, when the discharge controller 86 executes the discharge current control, the discharge current command value I2* and the current discharge duration TD are set based on the operating points of the internal combustion engine 10. In contrast to this, in the present embodiment, when the current discharge duration TD (>0) is set based on the operating points, a process of correcting the current discharge duration TD set based on the operating points is employed.

Figure 9:
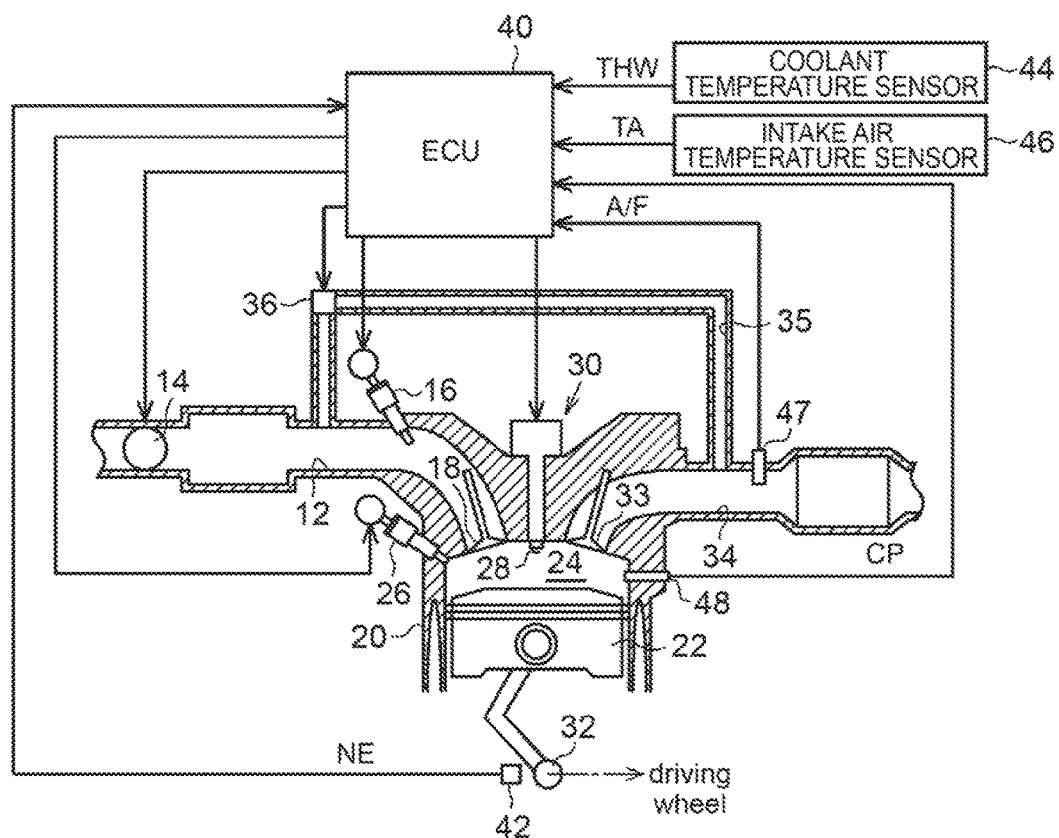
FIG. 9 is a configuration diagram of a system including a control device for an internal combustion engine according to a third embodiment.

FIG. 9 illustrates a system configuration according to the present embodiment. In FIG. 9, the same reference symbols are assigned to the elements that are the same as those illustrated in FIG. 1, for the sake of convenience. As illustrated in FIG. 9, in the present embodiment, an in-cylinder pressure sensor 48 that detects a pressure (in-cylinder pressure CP) is provided in the combustion chamber 24.

Figure 10:
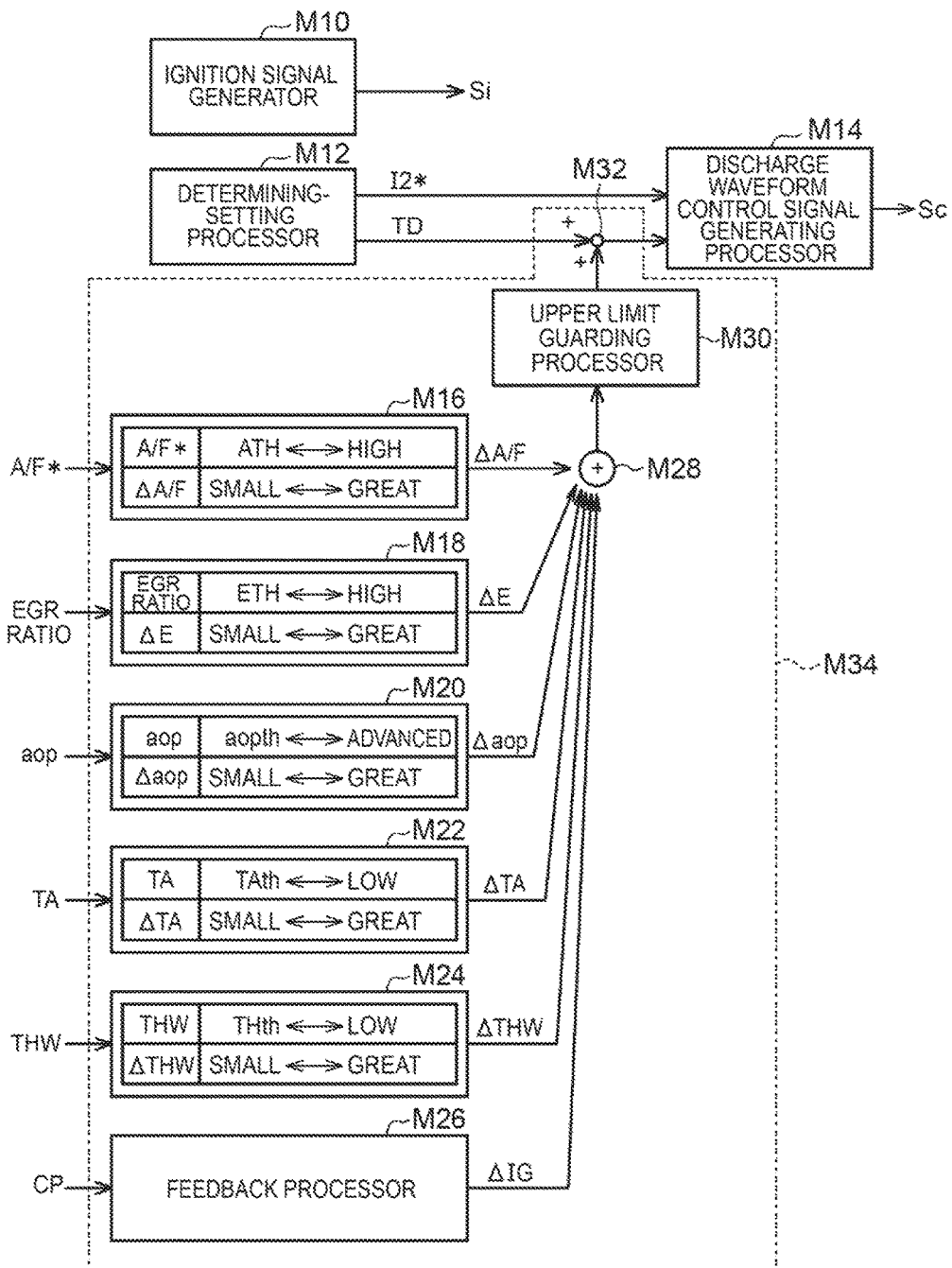
FIG. 10 is a block diagram illustrating a process of generating an ignition signal and a discharge waveform control signal according to the third embodiment.

FIG. 10 illustrates a process of generating an ignition signal Si and a discharge waveform control signal Sc according to the present embodiment. In FIG. 10, the same reference symbols are assigned to the processes that are the same as those illustrated in FIG. 5, for the sake of convenience.

A correction amount calculating processor M16 receives a target value A/F* as an input. When the target value A/F* is equal to or higher than a specified value ATH, the correction amount calculating processor M16 calculates and outputs a prolonging correction amount (air-fuel ratio correction amount ΔA/F) for making a correction of prolonging the current discharge duration TD set by the determining-setting processor M12. More specifically, the correction amount calculating processor M16 has a map that defines the relationship between the air-fuel ratio and the air-fuel ratio correction amount ΔA/F. The correction amount calculating processor M16 calculates the air-fuel ratio correction amount ΔA/F based on the target value A/F*. In this case, the correction amount calculating processor M16 sets the air-fuel ratio correction amount ΔA/F to a greater value when the target value A/F* is high than when the target value A/F* is low. Specifically, the correction amount calculating processor M16 continuously increases the air-fuel ratio correction amount ΔA/F as the target value A/F* increases. In this case, the map defines the output variable (in this case, the air-fuel ratio correction amount ΔA/F) for each of discrete values of the input variable (in this case, the air-fuel ratios). However, the air-fuel ratio correction amount ΔA/F can be continuously increased as the target value A/F* increases, by executing interpolation calculation. When the target value A/F* is lower than the specified value ATH, the correction amount calculating processor M16 sets the air-fuel ratio correction amount ΔA/F to zero, and sets the specified value ATH to a value higher than the stoichiometric air-fuel ratio.

A correction amount calculating processor M18 receives an EGR ratio as an input. When the EGR ratio is equal to or higher than a specified ratio ETH, the correction amount calculating processor M18 calculates and outputs a prolonging correction amount (EGR correction amount ΔE) for making a correction of prolonging the current discharge duration TD set by the determining-setting processor M12. More specifically, the correction amount calculating processor M18 has a map that defines the relationship between the EGR ratio and the EGR correction amount ΔE. The correction amount calculating processor M18 calculates the EGR correction amount ΔE based on the EGR ratio. In this case, the correction amount calculating processor M18 sets the EGR correction amount ΔE to a greater value when the EGR ratio is high than when the EGR ratio is low. Specifically, the correction amount calculating processor M18 continuously increases the EGR correction amount ΔE as the EGR ratio increases. The specified ratio ETH is higher than the prescribed ratio Eth in the process in step S12 in FIG. 6. The EGR correction amount ΔE at the time when the EGR ratio is the prescribed ratio Eth is zero.

A correction amount calculating processor M20 receives an ignition timing aop as an input. When the ignition timing aop is advanced by an amount equal to or greater than a prescribed amount aopth with respect to a reference value, the correction amount calculating processor M20 calculates and outputs a prolonging correction amount (ignition timing correction amount Δaop) for making a correction of prolonging the current discharge duration TD set by the determining-setting processor M12. More specifically, the correction amount calculating processor M20 has a map that defines the relationship between the ignition timing aop and the ignition timing correction amount Δaop. The correction amount calculating processor M20 calculates the ignition timing correction amount Δaop based on the ignition timing aop. Specifically, when the ignition timing aop is advanced by an amount equal to or greater than a prescribed amount with respect to the reference value, the correction amount calculating processor M20 continuously increases the ignition timing correction amount Δaop as the ignition timing sop is further advanced. This is because the temperature of the air-fuel mixture in the combustion chamber 24 at the ignition timing is lower and thus an ignition delay is more likely to occur when the ignition timing is advanced than when the ignition timing is retarded. In FIG. 10, the ignition timing advanced by a prescribed amount with respect to the reference value is denoted by "aopth".

A correction amount calculating processor M22 receives an intake air temperature TA as an input. When the intake air temperature TA is equal to or lower than a prescribed temperature TAth, the correction amount calculating processor M22 calculates and outputs a prolonging correction amount (intake air temperature correction amount ΔTA) for making a correction of prolonging the current discharge duration TD set by the determining-setting processor M12. More specifically, the correction amount calculating processor M22 has a map that defines the relationship between the intake air temperature TA and the intake air temperature correction amount ΔTA. The correction amount calculating processor M22 calculates the intake air temperature correction amount ΔTA based on the intake air temperature TA. In this case, the correction amount calculating processor M22 sets the intake air temperature correction amount ΔTA to a greater value when the intake air temperature TA is low than when the intake air temperature TA is high. Specifically, the correction amount calculating processor M22 continuously increases the intake air temperature correction amount ΔTA as the intake air temperature TA lowers.

A correction amount calculating processor M24 receives a coolant temperature THW as an input. When the coolant temperature THW is equal to or lower than a prescribed coolant temperature THth, the correction amount calculating processor M24 calculates and outputs a prolonging correction amount (coolant temperature correction amount ΔTHW) for making a correction of prolonging the current discharge duration TD set by the determining-setting processor M12. More specifically, the correction amount calculating processor M24 has a map that defines the relationship between the coolant temperature THW and the coolant temperature correction amount ΔTHW. The correction amount calculating processor M24 calculates the coolant temperature correction amount ΔTHW based on the coolant temperature THW. In this case, the correction amount calculating processor M24 sets the coolant temperature correction amount ΔTHW to a greater value when the coolant temperature THW is low than when the coolant temperature THW is high. Specifically, the correction amount calculating processor M24 continuously increases the coolant temperature correction amount ΔTHW as the coolant temperature THW lowers.

A feedback processor M26 detects reduction in the ignitability based on the in-cylinder pressure CP detected by the in-cylinder pressure sensor 48. When reduction in the ignitability is detected, the feedback processor M26 calculates and outputs a prolonging correction amount (feedback correction amount ΔIG) for making a correction of prolonging the current discharge duration TD set by the determining-setting processor M12.

Figure 11:
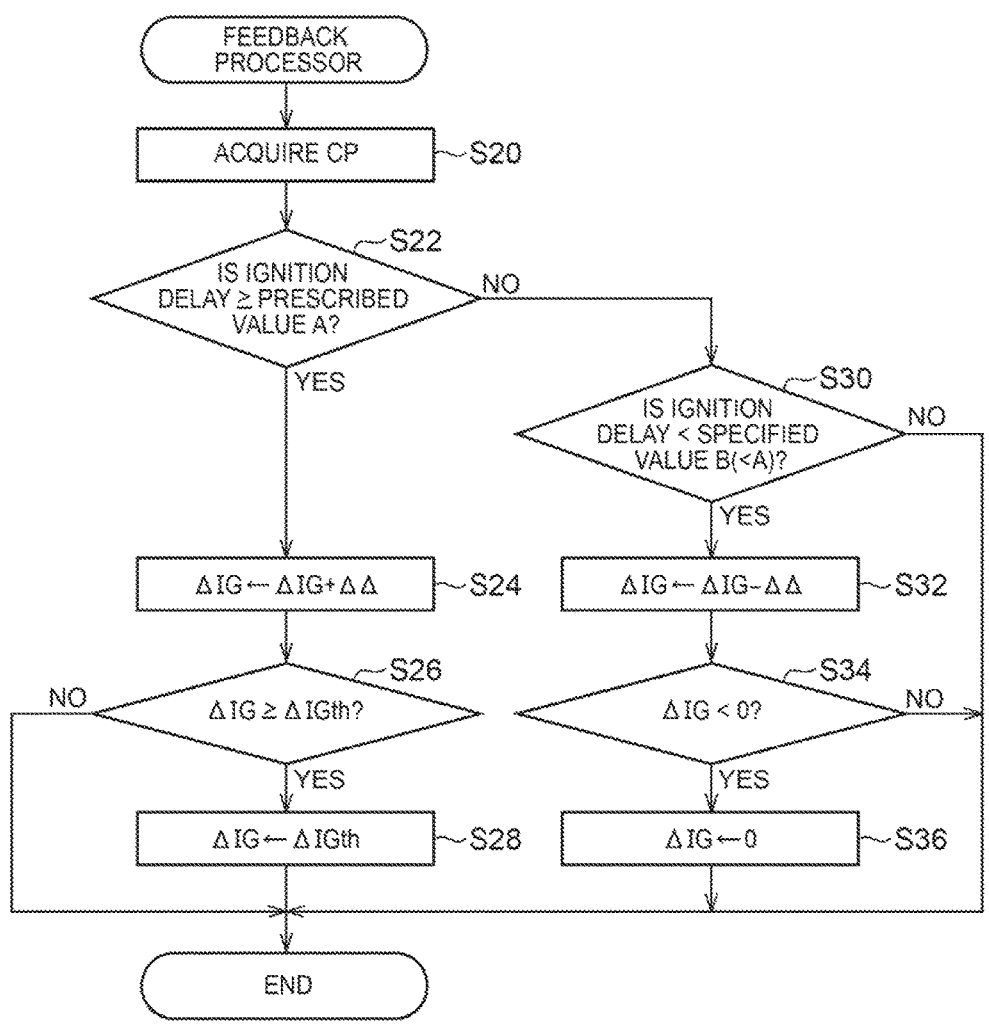
FIG. 11 is a flowchart illustrating the procedure of processes executed by a feedback processor according to the third embodiment.

FIG. 11 illustrates the procedure of processes executed by the feedback processor M26. This series of processes is repeatedly executed, for example, at a prescribed cycle, when the current discharge duration TD (>0) set by the determining-setting processor M12 is used.

In this series of processes, first, the feedback processor M26 acquires an in-cylinder pressure CP (S20). Subsequently, the feedback processor M26 determines whether or not the ignition delay determined based on the in-cylinder pressure CP is equal to or longer than a prescribed value A (S22). This process is executed in order to detect reduction in the ignitability by determining whether or not the ignitability is reduced. In this case, the timing at which the air-fuel mixture is ignited can be determined based on an increase in the rate of increase in the pressure obtained by subtracting a change in the in-cylinder pressure CP caused by displacement of the piston 22 from the in-cylinder pressure CP.

When the feedback processor M26 determines that the ignition delay is equal to or longer than the prescribed value A (S22: YES), the feedback processor M26 adds a prescribed amount ΔΔ to the feedback correction amount ΔIG (S24). This process is executed in order to make a correction of prolonging the current discharge duration TD set by the determining-setting processor M12. Subsequently, the feedback processor M26 determines whether or not the feedback correction amount ΔIG is equal to or greater than an upper limit value ΔIGth (S26). When the feedback processor M26 determines that the feedback correction amount ΔIG is equal to or greater than the upper limit value ΔIGth (S26: YES), the feedback processor M26 sets the feedback correction amount ΔIG as the upper limit value ΔIGth (S28).

On the other hand, when the feedback processor M26 determines that the ignition delay is shorter than the prescribed value A (S22: NO), the feedback processor M26 determines whether or not the ignition delay is shorter than a specified value B that is shorter than the prescribed value A (S30). This process is executed in order to determine whether or not the feedback correction amount ΔIG is decreased. When the feedback processor M26 determines that the ignition delay is shorter than the specified value B (S30: YES), the feedback processor M26 subtracts the prescribed amount ΔΔ from the feedback correction amount ΔIG (S32). Subsequently, the feedback processor M26 determines whether or not the feedback correction amount ΔIG is less than zero (S34). When the feedback processor M26 determines that the feedback correction amount ΔIG is less than zero (S34: YES), the feedback processor M26 sets the feedback correction amount ΔIG to zero (S36).

When the process in step S28 or step S36 ends, or when a negative determination is made in step S26, step S30, or step S34, the feedback processor M26 ends this series of processes.

An adding processor M28 illustrated in FIG. 10 adds together the air-fuel ratio correction amount ΔA/F, the EGR correction amount ΔE, the ignition timing correction amount Δaop, the intake air temperature correction amount ΔTA, the coolant temperature correction amount ΔTHW, and the feedback correction amount ΔIG, and then the adding processor M28 outputs a result of addition. An upper limit guarding processor M30 subjects an output value of the adding processor M28 to an upper limit guard process, and then the upper limit guarding processor M30 outputs a result obtained through the upper limit guard process. A correction amount reflecting processor M32 corrects the current discharge duration TD set by the determining-setting processor M12 by adding the output value of the upper limit guarding processor M30 to the current discharge duration TD set by the determining-setting processor M12. The discharge waveform control signal generating processor M14 generates and output a discharge waveform control signal Sc based on the current discharge duration TD output from the correction amount reflecting processor M32. In FIG. 10, a correcting processor M34 includes the correction amount calculating processors M16, M18, M20, M22, and M24, the feedback processor M26, the adding processor M28, the upper limit guarding processor M30, and the correction amount reflecting processor M32.

The current discharge duration TD set in step S16 in FIG. 6 is an open-loop manipulated variable for executing control for preventing reduction in the ignitability caused by the EGR ratio being equal to or higher than the prescribed ratio. The air-fuel ratio correction amount ΔA/F, the EGR correction amount ΔE, the ignition timing correction amount Δaop, the intake air temperature correction amount ΔTA, and the coolant temperature correction amount ΔTHW in FIG. 10 are open-loop manipulated variables for executing control for preventing reduction in the ignitability caused by various parameters. In contrast to this, the feedback correction amount ΔIG of the feedback processor M26 is a feedback manipulated variable for executing control for preventing reduction in the ignitability.

Next, an operation of the present embodiment will be described. When the determining-setting processor M12 determines that the EGR ratio is equal to or higher than the prescribed ratio Eth, the determining-setting processor M12 sets the discharge current command value I2* and the current discharge duration TD. The correcting processor M34 makes a correction to the current discharge duration TD set by the determining-setting processor M12, based on a factor of reduction in the ignitability which cannot be determined from only the operating points used when the determining-setting processor M12 sets the current discharge duration TD. In other words, for example, when the EGR ratio is considerably higher than the prescribed ratio Eth, the correcting processor M34 corrects the current discharge duration TD set by the determining-setting processor M12, based on the EGR correction amount ΔE. The determining-setting processor M12 may set an appropriate current discharge duration TD when the EGR ratio is the prescribed ratio Eth.

Other Embodiments

At least one of the matters in the above-described embodiments may be modified as described below. In the description below, the correspondence relationships between matters described in "SUMMARY OF THE INVENTION" and matters in the above-described embodiments are indicated by, for example, reference symbols. However, the correspondence relationships indicated below are not intended to limit the matters.

Regarding Determining Processor (S10, S12; S10a, S12a)

In the second embodiment, it may be determined that the ignitability is equal to or lower than the prescribed ignitability when the air-fuel ratio A/F detected by the air-fuel ratio sensor 47 is equal to or higher than the prescribed value A/F, instead of determining that the ignitability is equal to or lower than the prescribed ignitability when the target value A/F* is equal to or higher than the prescribed value A/F.

As the determining-setting processor M12 according to the third embodiment, the determining-setting processor M12 described in the second embodiment (FIG. 8) may be employed. However, in this case, the specified value ATH is desirably set to a value higher than the prescribed value Afth in step S12a in FIG. 8. The specified value ATH is used as a reference value when the correction amount calculating processor M16 determines whether or not the air-fuel ratio correction amount ΔA/F is set to a value greater than zero.

In the first and third embodiments (FIG. 6), instead of step S12, the ignitability may be determined to be equal to or lower than the prescribed ignitability when a logical sum of the EGR ratio being equal to or higher than the prescribed ratio Eth and the target value A/F* being equal to or higher than the prescribed value Afth is true (i.e., when at least one of the condition that the EGR ratio is equal to or higher than the prescribed ratio Eth and the condition that the target value A/F* is equal to or higher than the prescribed value Afth is satisfied).

For example, the prescribed ratio Eth in step S12 may be variably set based on the air-fuel ratio (e.g. the target value A/F*), or the prescribed value Afth in step S12a may be variably set based on the EGR ratio.

The condition for determining that the ignitability is equal to or lower than the prescribed ignitability is not limited to only the conditions regarding the constituent ratio of the air-fuel mixture, such as the condition that the EGR ratio is equal to or higher than the prescribed ratio Eth and the condition that the target value A/F* is equal to or higher than the prescribed value Afth. The condition for determining that the ignitability is equal to or lower than the prescribed ignitability may include, for example, the condition that the intake air temperature is equal to or lower than a prescribed temperature and the condition that the humidity in the intake air is equal to or higher than a prescribed value.

Regarding Correcting Processor (M34)

In the third embodiment (FIG. 10), all of the air-fuel ratio correction amount ΔA/F, the EGR correction amount ΔE, the ignition timing correction amount Δaop, the intake air temperature correction amount ΔTA, the coolant temperature correction amount ΔTHW, and the feedback correction amount ΔIG are used. However, it is not necessary to use all of these values. For example, the current discharge duration TD set by the determining-setting processor M12 may be corrected based on one of these values or two to five of these values.

In the third embodiment (FIG. 10), the current discharge duration TD set by the determining-setting processor M12 is corrected based on the sum of the air-fuel ratio correction amount ΔA/F, the EGR correction amount ΔE, the ignition timing correction amount Δaop, the intake air temperature correction amount ΔTA, the coolant temperature correction amount ΔTHW, and the feedback correction amount ΔIG. However, the manner of correcting the current discharge duration TD set by the determining-setting processor M12 is not limited to this. For example, the current discharge duration TD set by the determining-setting processor M12 may be corrected based on, for example, the maximum values of these correction amounts.

The elements used to make a correction of prolonging the current discharge duration TD set by the determining-setting processor M12 are not limited to the air-fuel ratio A/F, the EGR ratio, the ignition timing, the intake air temperature TA, the coolant temperature THW, and the like. For example, when the humidity in the intake air is high, the current discharge duration TD set by the determining-setting processor M12 may be corrected to be prolonged. For example, in an internal combustion engine in which the compression ratio can be changed, the current discharge duration TD set by the determining-setting processor M12 may be corrected to be prolonged with a decrease in the compression ratio. For example, when a speed change device is provided between the crankshaft 32 and the drive wheels, the current discharge duration TD set by the determining-setting processor M12 may be corrected to be prolonged as the temperature of hydraulic fluid is lower.

Regarding Correction Amount Calculating Processor

In the above-described embodiment, the correction amount calculating processor M16 continuously increases the air-fuel ratio correction amount ΔA/F as the target value A/F* increases. Alternatively, the air-fuel ratio correction amount ΔA/F may be increased, for example, in a stepwise manner. Further alternatively, for example, when the target value A/F* is equal to or higher than the specified value ATH, the air-fuel ratio correction amount ΔA/F may be set to single value greater than zero.

In the above-described embodiments, the correction amount calculating processor M16 receives a target value A/F* as an input, and calculates the air-fuel ratio correction amount ΔA/F. Alternatively, the correction amount calculating processor M16 may receive, as an input, the air-fuel ratio A/F detected by the air-fuel ratio sensor 47, and calculate the air-fuel ratio correction amount ΔA/F.

In the above-described embodiment, the correction amount calculating processor M18 continuously increases the EGR correction amount ΔE as the EGR ratio increases. Alternatively, the EGR correction amount ΔE may be increased, for example, in a stepwise manner. Further alternatively, for example, when the EGR ratio is equal to or higher than the specified ratio ETH, the EGR correction amount ΔE may be set to a single value greater than zero.

In the above-described embodiment, the correction amount calculating processor M20 continuously increases the ignition timing correction amount Δaop as the ignition timing aop is advanced. Alternatively, the ignition timing correction amount Δaop may be increased, for example, in a stepwise manner. Further alternatively, for example, when the ignition timing aop is advanced by an amount equal to or greater than the prescribed amount aopth, the ignition timing correction amount Δaop may be set to a single value greater than zero.

In the above-described embodiment, the correction amount calculating processor M22 continuously increases the intake air temperature correction amount ΔTA as the intake air temperature TA lowers. Alternatively, the intake air temperature correction amount ΔTA may be increased, for example, in a stepwise manner. Further alternatively, for example, when the intake air temperature TA is equal to or lower than the prescribed temperature TAth, the intake air temperature correction amount ΔTA may be set to a single value greater than zero.

In the above-described embodiment, the correction amount calculating processor M24 continuously increases the coolant temperature correction amount ΔTHW as the coolant temperature THW lowers. Alternatively, the coolant temperature correction amount ΔTHW may be increased, for example, in a stepwise manner. Further alternatively, for example, when the coolant temperature THW is equal to or lower than the prescribed coolant temperature THth, the intake air temperature correction amount ΔTA may be set to a single value greater than zero.

In the above-described embodiment, the correction amount calculating processor M18 receives an EGR ratio as an input, and calculates the EGR correction amount ΔE. Alternatively, the correction amount calculating processor M18 may receive, for example, an intake air amount and an EGR amount as inputs, and calculate the EGR correction amount ΔE.

Regarding Detecting Processor (S22)

The configuration is not limited to a configuration in which a detecting processor is implemented by the ECU 40 that executes the process in step S22. In other words, the configuration is not limited to a configuration in which an ignition delay is detected based on the in-cylinder pressure CP detected by the in-cylinder pressure sensor 48. For example, the ECU 40 may detect a misfire based on a change in the rotation speed NE detected by the crank angle sensor 42. In other words, the ECU 40 may detect reduction in the ignitability in response to the occurrence of a misfire.

Regarding Feedback Processor

The upper limit guard process (S26, S28) is not essential. In particular, when the upper limit guarding processor M30 is provided, the upper limit guard process may be replaced with the upper limit guarding processor M30.

Regarding Setting Processor (S14, S16)

In the above-described embodiments, the discharge current command value I2* and the current discharge duration TD are set based on the rotation speed NE and the load. However, the manner of setting the discharge current command value I2* and the current discharge duration TD is not limited to this. For example, the discharge current command value I2* and the current discharge duration TD may be set based on only the rotation speed NE. In this case, the current discharge duration TD is set longer when the rotation speed NE is low than when the rotation speed NE is high, and the discharge current command value I2* is set higher when the rotation speed NE is high than when the rotation speed NE is low. In this case, as described in the third embodiment, when the process of correcting the current discharge duration TD set by the determining-setting processor M12 is executed, the current discharge duration ID may be corrected to be prolonged when the load is low.

Regarding Process of Correcting Setting by Setting Processor

In the third embodiment, when the current discharge duration TD set by the determining-setting processor M12 is corrected to be prolonged, the discharge current command value I2* is maintained at the value set by the determining-setting processor M12. However, the manner of making a correction of prolonging the current discharge duration TD set by the determining-setting processor M12 is not limited to this. For example, when the value obtained through addition by the adding processor M28 exceeds a guard value of the upper limit guarding processor M30 by an amount equal to or greater than a specified value, the guard value may be corrected to be increased, instead of making a correction of reducing the discharge current command value I2*.

The configuration is not limited to a configuration in which the current discharge duration TD set by the determining-setting processor M12 is corrected. A configuration in which the discharge current command value I2* is corrected may be employed. That is, for example, in a case where an internal combustion engine is provided with an airflow control valve, such as a tumble control valve or a swirl control valve, the rate of airflow is considered to become high when the opening degree of the airflow control valve is equal to or less than a prescribed value. Thus, a correction of increasing the discharge current command value I2* may be made when the opening degree of the airflow control valve is equal to or less than the prescribed value. For example, in a case where an internal combustion engine is provided with a valve characteristic variable mechanism configured to increase the valve duration of the intake valve 18 (i.e., the length of time, in degrees, that the intake valve 18 is held open), the rate of airflow is considered to become high when the valve duration is equal to or larger than a prescribed value. Thus, a correction of increasing the discharge current command value I2* may be made when the valve duration is equal to or larger than the prescribed value.

Regarding Execution Command Processor (M12 and M14 Executing Processes in S14 and S16)

The configuration is not limited to a configuration in which the discharge current command value I2* is superimposed on the discharge waveform control signal Sc. The discharge current command value I2* may be transmitted to the ignition device 30 through another communication line.

Regarding Discharge Controller

The configuration is not limited to a configuration in which a detected value of the discharge current value is adjusted to the discharge current command value I2* through feedback control. A detected value of the discharge current value may be adjusted to the discharge current command value I2* through open-loop control. The open-loop control can be implemented by variably setting the time ratio of an opening-closing operation of the control switching device 80 based on the discharge current command value I2*. It is desirable to take into account the information regarding a load on the internal combustion engine 10 in setting the time ratio.

Regarding Discharge Control Circuit (70, 80, 82)

It is not necessary to use the battery 39 as a first power source and to use the battery 39 and the booster circuit 70 as a second power source. For example, there may be provided a circuit that can connect the battery 39 and the primary coil 52 to each other such that a voltage having a polarity opposite to that at the time of a closing operation of the ignition switching device 60 is applied to the primary coil 52. In this case, the battery 39 serves as both a first power source and a second power source.

The configuration is not limited to a configuration in which the primary coil 52 is energized in order to control the discharge current of the spark plug 28. For example, instead of the primary coil 52, a third coil magnetically coupled to the secondary coil 54 may be energized. In this case, both ends of the third coil are insulated during a closing operation of the ignition switching device 60. After an opening operation of the ignition switching device 60 is performed, the third coil is energized in the same manner as the manner of energizing the primary coil 52 in the above-described embodiment.

The configuration is not limited to a configuration in which the spark plug 28 does not discharge electricity when the ignition switching device 60 is in a closed state. For example, electricity may be discharged from one of the electrodes of the spark plug 28 to the other one of the electrodes of the spark plug 28 by closing the ignition switching device 60, and electricity may be discharged from the other one of the electrodes of the spark plug 28 to the one of the electrodes of the spark plug 28 due to a counter-electromotive force generated in the secondary coil 54, by performing an opening operation of the ignition switching device 60. Even in this case, it is advantageous to provide a discharge control circuit that maintains a discharge current after electric discharge from the other one of the electrodes to the one of the electrodes is started.

Regarding Internal Combustion Engine

The internal combustion engine is not limited to an internal combustion engine that supplies drive power to drive wheels of a vehicle. For example, the internal combustion engine may be an internal combustion engine mounted in a series hybrid vehicle.

What is claimed is:

1. A control device for an internal combustion engine, the control device configured to control a controlled variable of the internal combustion engine by operating an ignition device including a spark plug provided in a combustion chamber of the internal combustion engine, an ignition coil connected to the spark plug, a discharge control circuit configured to maintain a discharge current after the spark plug starts electric discharge, and a discharge controller configured to control the discharge current by operating the discharge control circuit, the control device comprising:

a determining processor configured to determine, based on a constituent ratio of an air-fuel mixture in the combustion chamber, whether or not an ignitability of the air-fuel mixture in the combustion chamber in a case where discharge current control by the discharge controller is not executed after the spark plug starts electric discharge, is equal to or lower than a prescribed ignitability; and an execution command processor configured to cause the discharge controller to execute the discharge current control when the determining processor determines that the ignitability is equal to or lower than the prescribed ignitability, wherein the execution command processor includes a setting processor configured to set a discharge current command value and a current discharge duration, the discharge current command value being a command value for the discharge current control executed by the discharge controller, and the current discharge duration being a period of time during which the discharge controller controls the discharge current, the setting processor is configured to set the discharge current command value to a higher value when a rotation speed of the internal combustion engine is greater than a high value than when the rotation speed of the internal combustion engine is lower than a low value, and the setting processor is configured to set the current discharge duration to a longer value when the rotation speed of the internal combustion engine is lower than the low value than when the rotation speed of the internal combustion engine is greater than the high value, wherein the high value is greater than the low value.

2. The control device for the internal combustion engine according to claim 1,
wherein the setting processor variably sets the discharge current command value and the current discharge duration based on a load on the internal combustion engine in addition to the rotation speed.

3. The control device for the internal combustion engine according to claim 1, the control device further comprising a correcting processor configured to make a correction of prolonging the current discharge duration set by the setting processor when an air-fuel ratio in the combustion chamber of the internal combustion engine is equal to or higher than a specified value,
wherein the specified value is higher than a stoichiometric air-fuel ratio.

4. The control device for the internal combustion engine according to claim 1, wherein:
the internal combustion engine includes a recirculation passage that provides communication between an exhaust passage and an intake passage, and a recirculation valve that adjusts a flow passage cross-sectional area of the recirculation passage; and
the control device includes a correcting processor configured to make a correction of prolonging the current discharge duration set by the setting processor when an exhaust gas recirculation ratio is equal to or higher than a specified ratio, the exhaust gas recirculation ratio being a ratio of exhaust gas flowing into the combustion chamber through the recirculation passage with respect to a fluid flowing into the combustion chamber.

5. The control device for the internal combustion engine according to claim 1, the control device further comprising a correcting processor configured to make a correction of prolonging the current discharge duration set by the setting processor when an ignition timing of the internal combustion engine is advanced by an amount equal to or greater than a prescribed amount with respect to a reference value.

6. The control device for the internal combustion engine according to claim 1, the control device further comprising a correcting processor configured to make a correction of prolonging the current discharge duration set by the setting processor when at least one of a condition that a temperature in an intake passage of the internal combustion engine is equal to or lower than a prescribed temperature and a condition that a coolant temperature is equal to or lower than a prescribed coolant temperature is satisfied.

7. The control device for the internal combustion engine according to claim 1, the control device further comprising:
a detecting processor configured to detect reduction in the ignitability of the air-fuel mixture in the combustion chamber; and
a correcting processor configured to make a correction of prolonging the current discharge duration set by the setting processor when the detecting processor detects reduction in the ignitability.

8. The control device for the internal combustion engine according to claim 1, wherein:
the internal combustion engine includes a recirculation passage that provides communication between an exhaust passage and an intake passage, and a recirculation valve that adjusts a flow passage cross-sectional area of the recirculation passage; and the determining processor is configured to determine that the ignitability of the air-fuel mixture in the combustion chamber is equal to or lower than the prescribed ignitability when an exhaust gas recirculation ratio is equal to or higher than a prescribed ratio, the exhaust gas recirculation ratio being a ratio of exhaust gas flowing into the combustion chamber through the recirculation passage with respect to a fluid flowing into the combustion chamber.

9. The control device for the internal combustion engine according to claim 1, wherein the determining processor determines that the ignitability of the air-fuel mixture in the combustion chamber is equal to or lower than the prescribed ignitability when an air-fuel ratio of the air-fuel mixture in the combustion chamber is equal to or higher than a prescribed value.

10. The control device for the internal combustion engine according to claim 1, wherein:
the ignition device includes an ignition switching device and a control switching device, the ignition switching device configured to open and close a first loop circuit including a primary coil of the ignition coil and a first power source, and the control switching device configured to open and close a second loop circuit including a second power source and the primary coil;
the discharge control circuit includes the control switching device;
the discharge controller is configured to control the discharge current of the spark plug by performing an opening-closing operation of the control switching device after the spark plug discharges electricity due to an electromotive force that is generated in a secondary coil of the ignition coil when the ignition switching device is switched from a closed state to an open state; and
a polarity of a voltage that is applied to the primary coil by the first power source when the first loop circuit is turned into a closed-loop circuit and a polarity of a voltage that is applied to the primary coil by the second power source when the second loop circuit is turned into a closed-loop circuit are opposite to each other.

* * * * *

UNITED STATES PATENT AND TRADEMARK OFFICE
CERTIFICATE OF CORRECTION

PATENT NO. : 9,964,092 B2
APPLICATION NO. : 15/243236
DATED : May 8, 2018
INVENTOR(S) : Satoshi Nakamura et al.

It is certified that error appears in the above-identified patent and that said Letters Patent is hereby corrected as shown below:

On the Title Page

For (73) Assignee, delete "TOYOTA TECHNICAL DEVELOPMENT CORPORATION" and insert --TOYOTA JIDOSHA KABUSHIKI KAISHA--, therefor.

Signed and Sealed this
Twenty-third Day of April, 2019

Andrei Iancu
*Director of the United States Patent and Trademark Office*